United States Patent [19]

Withrow et al.

[11] Patent Number: 4,782,208

[45] Date of Patent: Nov. 1, 1988

[54] METHOD AND APPARATUS FOR SLITTING METAL STRIPS

[76] Inventors: David A. Withrow, 3366 Broad Vista NW., Uniontown, Ohio 44685; Allen W. White, 1770 Clarendon, Lewisville, Tex. 75067

[21] Appl. No.: 56,418

[22] Filed: Jun. 1, 1987

[51] Int. Cl.[4] ............................................. B23K 26/00
[52] U.S. Cl. ........................... 219/121.72; 219/121.67; 219/121.18; 219/121.39; 219/121.44; 219/121.76; 219/121.78; 266/58
[58] Field of Search ................ 219/121 LG, 121 LN, 219/121 LU, 121 LY, 121 EH, 121 PC, 121 PH, 121 LS, 121 LT; 83/177, 53; 266/58, 60

[56] References Cited

U.S. PATENT DOCUMENTS

| | | | |
|---|---|---|---|
| 3,588,561 | 6/1971 | Hoffmeyer | 310/216 |
| 3,769,488 | 10/1973 | Hasslinger | 219/121 LM |
| 3,942,055 | 3/1976 | Hoffmeyer | 310/216 |
| 4,266,112 | 5/1981 | Niedermeyer | 219/121 LN |
| 4,469,930 | 9/1984 | Takahashi | 219/121 LN |
| 4,530,061 | 7/1985 | Henderson et al. | 364/475 |
| 4,533,813 | 8/1985 | Rayburn et al. | 219/121 LT X |
| 4,536,952 | 8/1985 | Shinryo et al. | 29/596 |
| 4,537,809 | 8/1985 | Ang et al. | 219/121 LG X |
| 4,549,063 | 10/1985 | Ang et al. | 219/121 LT X |
| 4,614,101 | 9/1986 | Fornataro | 72/160 |

*Primary Examiner*—C. L. Albritton
*Attorney, Agent, or Firm*—Body, Vickers & Daniels

[57] ABSTRACT

A non-contact cutting system and method cuts a strip of metal into narrow strands having varying width defining successive, longitudinally spaced portions from which end product pieces can be removed. An array of cutting heads is arranged to project cutting beams onto the surface of a metal strip to cut the strand edges in a predetermined pattern whereby a maximum number of end product piece areas is defined on the strip.

7 Claims, 7 Drawing Sheets

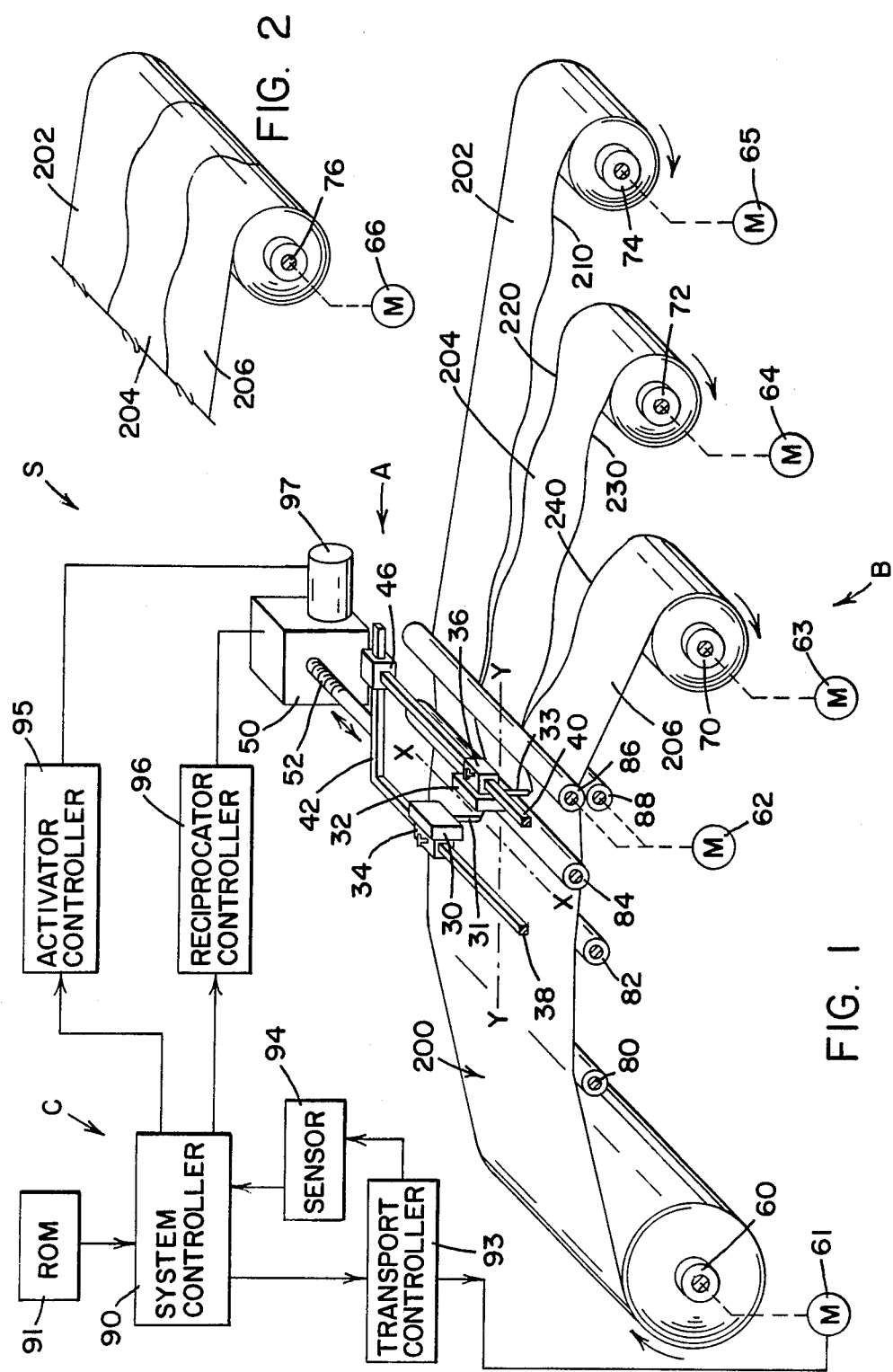

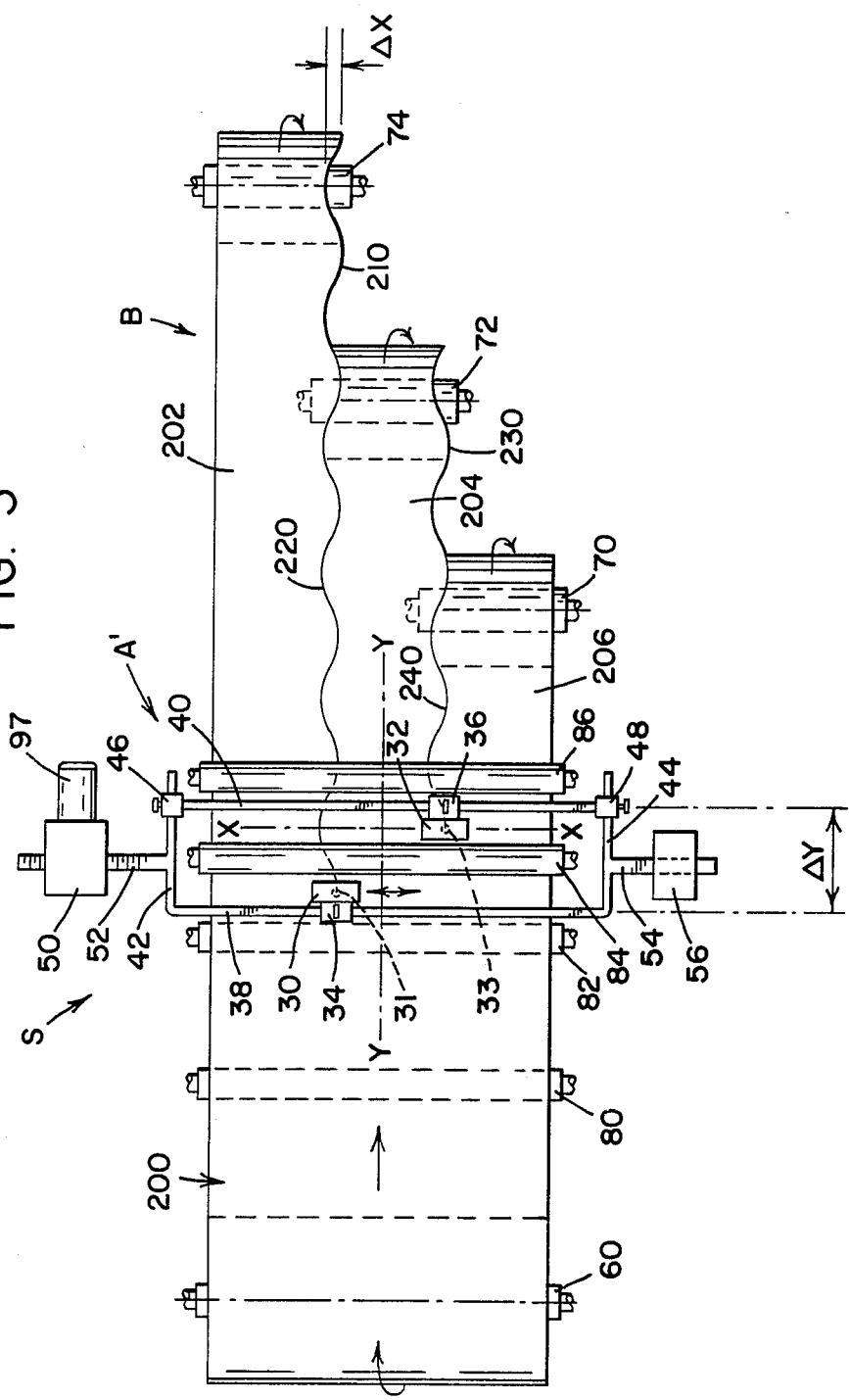

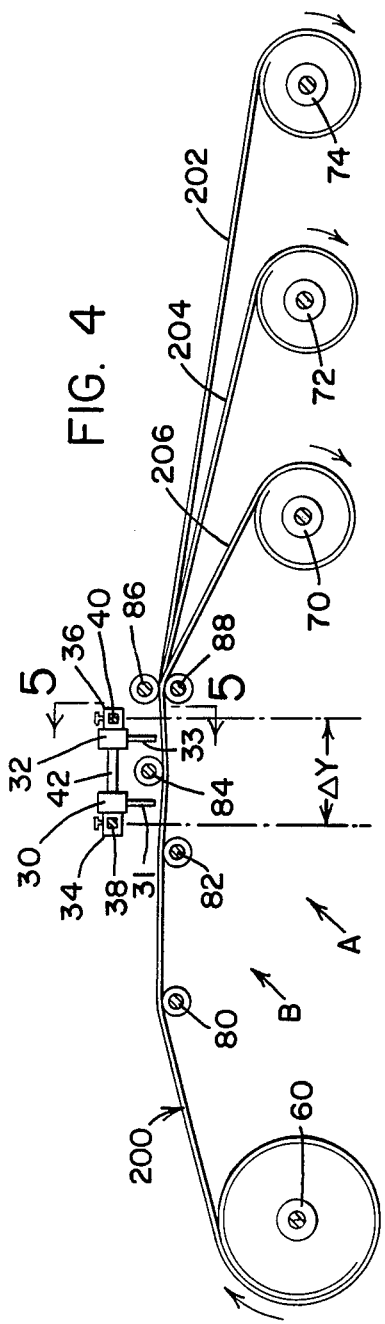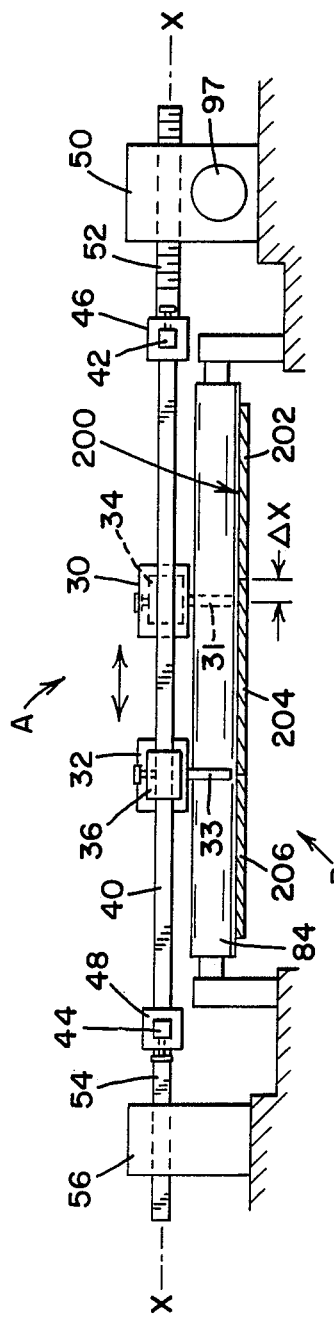

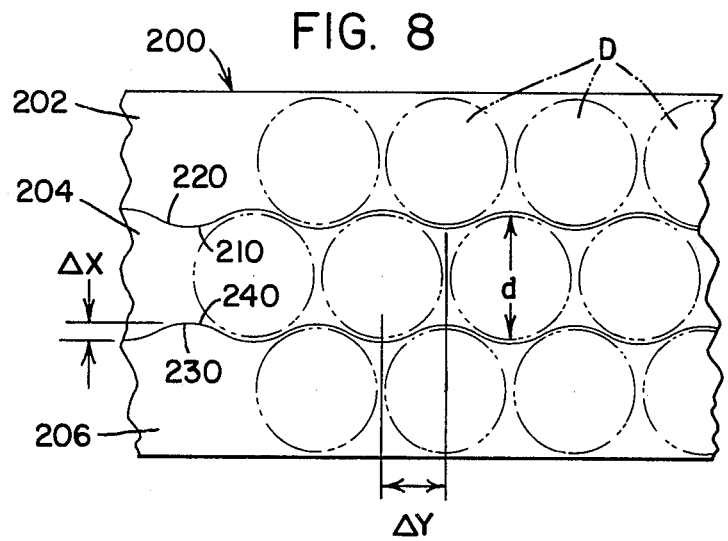
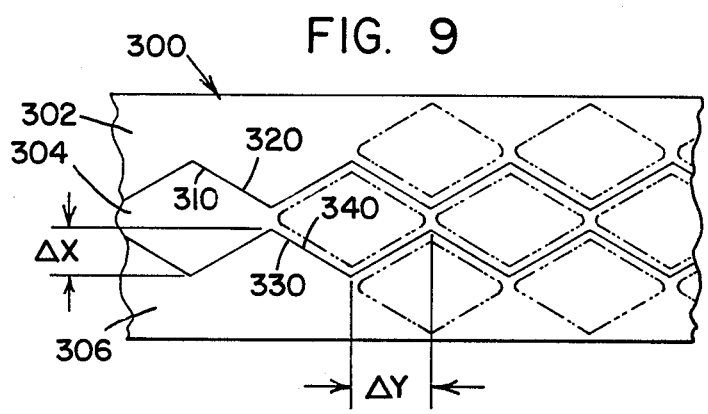

METHOD AND APPARATUS FOR SLITTING METAL STRIPS

The present invention relates to the art of cutting metal, and particularly to a method and system using high energy beams to cut an elongated sheet or strip of metal into linear strands having non-linear side edges.

BACKGROUND OF THE INVENTION

The present invention is particularly applicable to the production of sheet metal strands or strips from an elongated sheet metal web or strip, and will be described with reference thereto. However, it is understood that the invention has broader applications including the production of strips or strands of other types or gauges of metal materials initially produced in flat or wide strip form.

It is often desirable, as in the motor lamination industry, to produce great quantities of small oval or circular pieces of metal for the stator cores of electric motors. Such pieces are commonly produced by cutting a sheet or elongated strip of sheet metal into narrow individual strips or strands, and then punching or stamping out a closely spaced linear array of oval or circular pieces from each strand. In order to reduce waste material remaining after the pieces are stamped out of a sheet metal strand, it is necessary to space the pieces as closely as possible along the length of the strand. More importantly, and involving considerably greater difficulty, is the need to maintain the width of the sheet metal strand as closely as possible to the diameter of the desired end products. Minimizing the excess width of the strand reduces the waste material which necessarily is produced in the form of two thin, irregular strands representing the sides of the original strand extending between and laterally beyond the oval or circular portions.

It is known to address the problem of reducing waste material by cutting a master strip or web of sheet metal into individual strands or strips having non-linear edges. Non-linear edges which successively converge and diverge will define longitudinally successive portions of relatively greater width joined by successive portions of relatively lesser width. The portions of greater width provide the material for the finished end product pieces, which may be circular, oval, diamond shaped, or of any outline for which a closely spaced array of pieces is desired. When the non-linear edges are cut in curvilinear shape, the varying strand width will more closely match a linear array of ovals or circles to be stamped from within the strand and will thereby leave less unused strand material as waste. Mechanical gang slitting knives are commonly used to cut strips with diverging and converging strand edges from a moving web of metal sheet material in a time consuming and expensive process. Such knives have scalloped side faces and are extremely expensive and difficult to sharpen. Another disadvantage inherent in such knife cutting systems is the requirement for a different set of knives for each size and pattern of end product pieces, and hence strand edge patterns, desired by the user. Knife cutting systems further require complex mechanisms to maintain a necessary level of tension in the sheet material at and across the cutting surface. Lost production time during knife changeovers adds to the expense of these prior art systems.

It is also known that high energy beams can be used as a more efficient and effective means to cut sheets of material into strips. For example, cutting beams have been used in this manner to produce composite sheets of laminated material which are readily separable into strips of one or more individual layers. One such apparatus is disclosed in U.S. Pat. No. 4,537,809 to Ang et al., which disclosure is incorporated herein by reference and is exemplary of prior art energy beam cutting devices. The Ang et al. apparatus disclosed in this patent is useful in a process wherein the cut strands or strips themselves are the finished end product. The Ang et al. disclosure shows coextensively non-linear strand edges of corresponding in-phase curvature and does not address the need to control and vary the width of each strand in an opposed diverging and converging edge pattern to minimize waste produced when the end product is stamped out from within the strand. The prior art in the field of high energy beam cutting is thus seen to fail to overcome the above noted disadvantages inherent in knife cutting systems for producing strands with edge patterns as demanded by variously shaped sheet metal end products to be stamped therefrom.

SUMMARY OF THE INVENTION

The present invention contemplates a new and improved energy beam system and method which overcomes the above noted disadvantages and others, and which provides a means of using high energy beams to cut a strip or web of sheet material into strip-like strands having edges of non-linear form and which accommodate and maximize the number of individual pieces which may thereafter be punched or stamped from the strands while minimizing waste of the strand material.

In accordance with one aspect of the invention there is provided a system for cutting an elongated metal workpiece into longitudinal strip-like strands, which system includes a plurality of high energy cutting beam projectors moving to project a desired pattern of cutting beams onto and along the length of the workpiece. The beam projectors are disposed in a row transversely of the workpiece length, and are reciprocated across the workpiece to trace wave-like paths along the surface of the workpiece as it is carried longitudinally past the cutting beam projectors. Pairs of cutting beam projectors are reciprocated oppositely to one another such that corresponding wave-like paths traced by oppositely moving projectors are out of phase with respect to one another. The out of phase paths traced by projected cutting beams produce cut strand edges which alternately diverge and converge to provide longitudinally successive wide portions of a strand connected by alternately successive narrow portions.

In accordance with another aspect of the invention, there is provided a system for cutting an elongated metal workpiece into longitudinal strip-like strands, which system includes a plurality of high energy cutting beams disposed in an array of parallel rows. The rows of beam projectors extend transversely of the workpiece length and are reciprocated in unison across the workpiece to trace wave-like paths along the surface of the workpiece as it is carried longitudinally past the array of cutting beam projectors. The projectors are held in an array providing a staggered relationship between projectors transversely across the workpiece such that reciprocating motion of all the projectors in unison causes adjacent ones of the wave-like paths to be out of phase with respect to one another. The out of phase wave paths of projected cutting beams produce cut strand edges which alternately diverge and converge, thereby providing longitudinally successive wide portions of a strand connected by alternately successive narrow portions.

In accordance with still another aspect of the invention there is provided a system for cutting an elongated metal workpiece into longitudinal strip-like strands, which system includes a plurality of high energy cutting beam projectors spaced from one another along the length of the workpiece and independently reciprocated across the width of the workpiece such that each beam projector traces a wave-like path along the surface of the workpiece as it is carried longitudinally past the beam projectors. Each projector is reciprocated in timed relationship to an adjacent projector to trace a wave-like path which is out of phase with that traced by the adjacent projector.

In accordance with yet another aspect of the invention, there is provided a system for energy beam cutting of a strip of sheet metal moving in a linear feed path, which system includes beam cutting means operative to cut the strip into a plurality of longitudinal strip-like strands having nonlinear edges in a selected pattern alternating across the strip, and which system further includes means for automatically operating the beam cutting means in controlled, coordinated relationship with the movement of the strip along the conveyor.

The principal object of the invention is to provide a system and method of cutting a strip of sheet metal into adjacent longitudinal strip-like strands, which system and method provide improved efficiency and accuracy in producing selected strand patterns of alternating, variable strand widths, and to reduce the amount of scrap produced by increasing the amount of prime product usage.

Another object of the invention is to provide a system and method of cutting a metal strip into individual strip-like strands, which system and method use high energy cutting beams to produce selected patterns of adjacent cut strand widths, and which patterns maximize the number of predetermined areas to be defined on the surface of the strip and stamped out from the individual cut strands.

Another object of the invention is to provide a system for cutting a metal strip into adjacent longitudinal strip-like strands having a selected pattern of non-linear edges alternating across the strip, which system includes a cutting means operable to accommodate a wide range of such patterns thereby to obviate the need to substitute particular cutting means for each particular pattern.

Another object of the invention is to provide a system and method of torch cutting a sheet metal strip moving longitudinally, which system and method employ cutting means arranged to cut a selected pattern of strip-like strands along the strip, and which further include means for automatically controlling the cutting means to maintain the selected pattern of cut strands in accordance with the movement of the strip.

These and other objects and advantages of the invention will become apparent from the following description taken together with the accompanying drawings.

BRIEF DESCRIPTION OF THE DRAWINGS

In the drawings:

FIG. 1 is a schematic illustration of a beam cutting system according to the present invention for cutting a metal strip into a plurality of individual strands;

FIG. 2 is a partial perspective view of an alternate embodiment of the system shown in FIG. 1;

FIG. 3 is a plan view of another alternate embodiment of the system in FIG. 1;

FIG. 4 is a partial side elevation view of the system shown in FIG. 1;

FIG. 5 is a cross-sectional view of the system taken along line 5—5 of FIG. 4;

FIG. 8 is a plan view of a portion of a metal strip with the outlines of a plurality of circular end product pieces projected thereupon between the side edges of three adjacent longitudinal stran,qs cut from the strip by the system according to the invention;

FIG. 9 is a plan view of a portion of a metal strip with the outlines of a plurality of generally rectangular end product pieces projected thereupon between the side edges of three adjacent longitudinal strands cut from the strip by the system according to the invention; and, FIG. 10 is a partial plan view of still another embodiment of a system according to the invention.

DESCRIPTION OF A PREFERRED EMBODIMENT

Figure 6:
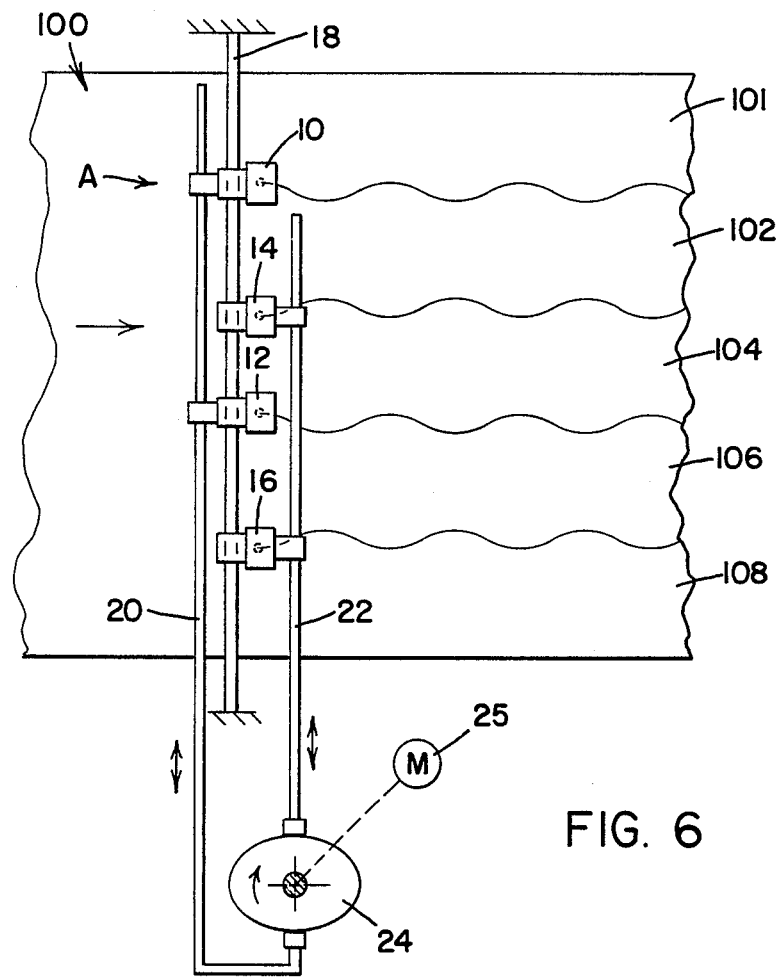
FIG. 6 is a plan view of another alternate embodiment of a beam cutting system according to the present invention.

Referring now to the drawings wherein the showings are for the purpose of illustrating a preferred embodiment of the invention only and not for the purpose of limiting the invention, a high energy beam cutting system S according to the invention is shown schematically in FIG. 1. The beam cutting system S is comprised of a cutting means denoted generally as A, a transport means denoted generally as B, and an automatic control means denoted generally as C. Control means C operates to cause cutting means A to cut metal strip 200 into strip-like longitudinal strands 202, 204 and 206 as transport means B feeds strip 200 from supply source 60 in a direction along a linear feed path parallel to longitudinal axis Y and past cutting means A to strand receiving units 70, 72 and 74. Alternately, strands 202, 204 and 206 may be received onto a single strand receiving unit 76 as shown in FIG. 2, or other possible receiving unit systems. Cutting means A may take several different forms, all of which produce the desired result of cutting strip 200 into strands having edges which alternately diverge and converge to define longitudinally successive wide portions of each strand, and with the wide portions of each strand being disposed longitudinally between those of adjacent strands.

Referring to FIG. 6, there is shown a preferred embodiment of cutting means A comprising two pairs of cutting beam projectors 10, 12 and 14, 16 for projecting high energy cutting beams. The beam projectors may take any suitable form known in the art, the projectors alone not forming part of the present invention. For example, the projectors may generate plasma torches, project laser beams or discharge a high pressure fluid. Cutting means A further includes carrying bar 18 extending transversely across the feed path of a strip 100 and holding beam projectors 10, 12 and 14, 16 an appropriate distance above the surface of strip 100. Beam projectors 10, 12 and 14, 16 are each slidably mounted on carrying bar 18. Beam projectors 10 and 12 are connected to reciprocator 24 through reciprocator arm 20, and beam projectors 14 and 16 are connected to reciprocator 24 through reciprocator arm 22. Reciprocator 24 moves adjacent pairs of beam projectors toward and away from one another along carrying bar 16 in timed relationship with the movement of strip 100 past cutting means A. As high energy cutting beams are projected onto the moving surface of strip 100 by beam projectors 10 and 14, movement of these beam projectors toward one another will cause the beams to cut converging edges of strand 102, and movement of these beam projectors away from one another will cause the beams to cut diverging edges of strand 102. movement of projectors 12 and 14 defines the edges of strand 104 in a like manner, and projectors 12 and 16 likewise defines the edges of strand 106. Projectors 10 and 16 each also define outer strands 101 and 108 respectively. Controlled reciprocation of the beam projectors transversely with respect to longitudinal movement of strip 100 is thus seen to cut strip 100 into strands having longitudinally successive wide portions connected by alternately successive narrow portions.

Referring now to FIG. 8, there is shown a graphic representation of three strands 202, 204 and 206 which may be produced by a cutting system using a single pair of beam projectors. A plurality of end product pieces sought to be produced from the cut strands of strip 200 are shown as circular areas D having diameters d. Strand edges 210, 220,230 and 240 are wave-like in form and ideally would approach sinusoidal wave forms in order to maximize the usable surface of strip 200 and minimize waste remaining after areas D are removed from the strands. In actual practice, strand edges 220 and 230 will satisfactorily optimize the shape of strand 204 when the strand edges take curvilinear forms producing successive widths closely matching the desired end piece diameters d, and converging to reduce the areas between pieces along the strand. Use of the overall surface area of strip 200 is optimized by the substantially 180° out of phase relationship between wavelike strand edges which enables the widest portions of one strand to laterally extend toward the narrow portions of an adjacent strand..

In FIG. 9 there is shown an alternate pattern of cut strand edges 310, 320, 330 and 340 which may be produced from a strip 300. The timed relationship between reciprocation of pairs of beam projectors toward and away from one another and the longitudinal movement of strand 300 along the feed path past cutting means A will determine the length and curvature, if any, of the converging and diverging sections of the strand edges. Rectangular oval or any other shape of the final products can therefore be accommodated by control of these relative motions within the system as will hereinafter be described with reference to control means C.

An alternate embodiment of cutting means A is shown as A' in FIG. 3. Cutting means A' differs from cutting mans A in that the pair of beam projectors shown are separately carried on carrying bars 38 and 40. Beam projectors 30 and 32 are slidably mounted on carrying bars 38 and 40 through releaseable sliding locators 34 and 36 respectively. Carrying bars 38 and 40 extend tranversely across the feed path of strip 200 and define two parallel rows being spaced apart in the direction of the strip feed path a spacing distance $\Delta Y$. Carrying bar 38 is fixed at each end thereof to crossbars 42 and 44, and carrying bar 40 is releaseably slidably mounted at each end on crossbars 42 and 44 through spacing locators 46 and 48. Selective positioning of spacing locators 46 and 48 along crossbars 42 and 44 enables selective determination of the spacing distance $\Delta Y$ between carrying bars 38 and 40. Cutting means A' thus provides an array of cutting beam projectors comprising parallel rows extending transversely across the longitudinal path of strip 200, and spaced apart in the direction of the feed path a selectable predetermined distance. Crossbar 42 is connected to reciprocator 50 through reciprocator arm 52, and crossbar 44 is connected to reciprocating guide 56 through reciprocator arm 54. Reciprocator 50 operates to move the array of cutting beam projectors, with projected beams 31 and 33, in unison back and forth a distance $\Delta X$ in a direction parallel to axis X in timed relationship to movement of strip 200 along axis Y.

Referring again to FIG. 8, there is shown a graphic representation of the parameters $\Delta X$ and $\Delta Y$ in relationship to a plurality of circular end product pieces D sought to be produced from strip 200 and strands 202, 204 and 206. The variation in width between the widest and narrowest portions of strand 204 is seen to depend upon the uniform reciprocating distance $\Delta X$. The wavelike pattern of strand edges is produced by the timed relationship of reciprocation through $\Delta X$ to the longitudinal movement of the strip along axis Y. The strand edges graphically illustrated in FIG. 8 ideally approach sinusoidal wave patterns in order to most closely follow the outlines of circular areas D, but in actual practice a generally curvilinear wave-like path of a strand edge is satisfactory. The widest portions of each strand are seen to extend transversely between the widest portions of adjacent strands in order to maximize the number of circular areas D defined on the overall surface of strip 200. This arrangement is obtained by spacing apart the parallel transverse rows of cutting beam projectors a distance $\Delta Y$ along the longitudinal feed path of strip 200. Distance $\Delta Y$ is preferred to approximate one-half the wave length of a curvilinear strand edge or, as shown in FIG. 9, one-half the distance between successive equal width regions of a strand.

Figure 7:
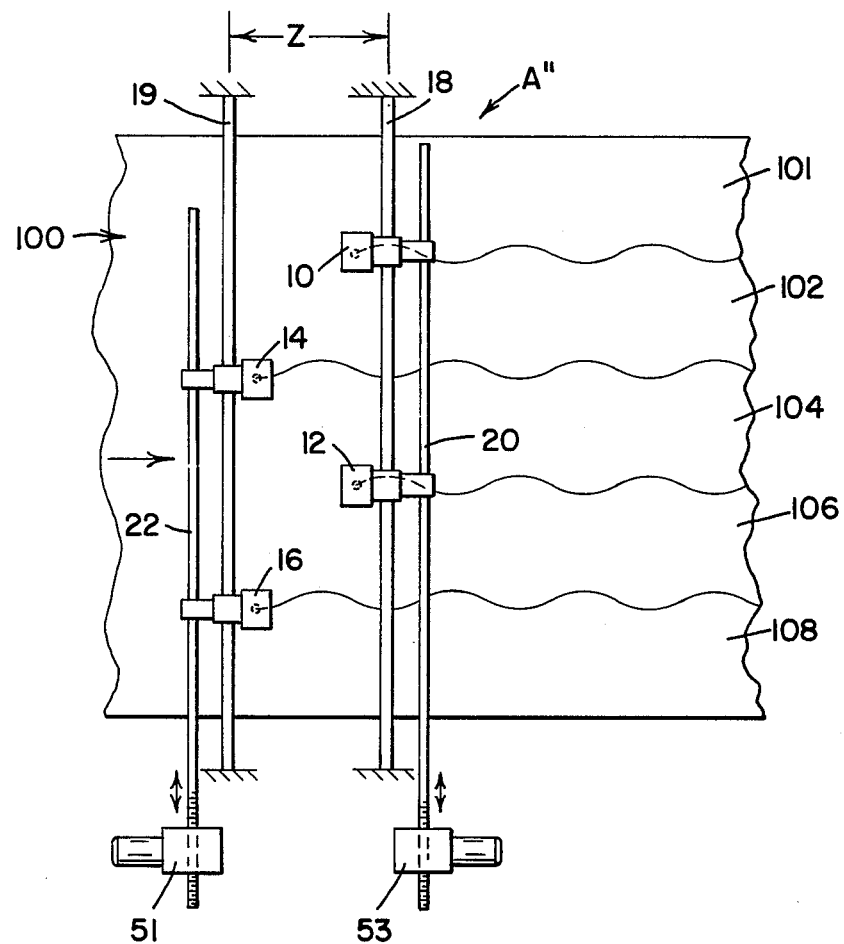
FIG. 7 is a plan view of yet another alternate embodiment of a beam cutting system according to the invention.

Yet another embodiment of cutting means A is shown in FIG. 7 as A''. Cutting means A'' comprises at least a pair of parallel rows of cutting beam projectors extending transversely of the longitudinal feed path and spaced apart a fixed distance Z. Cutting means A'' operates similarly to cutting means A described above except that the timed relationship between reciprocators 51, 53 and longitudinal movement of strip 100 in A'' is determined in consideration of the independently fixed parameter Z not found in cutting means A. Distance Z may take any value in this embodiment and is accommodated by control means C in operation of the system as will be described fully hereinafter.

Figure 10:
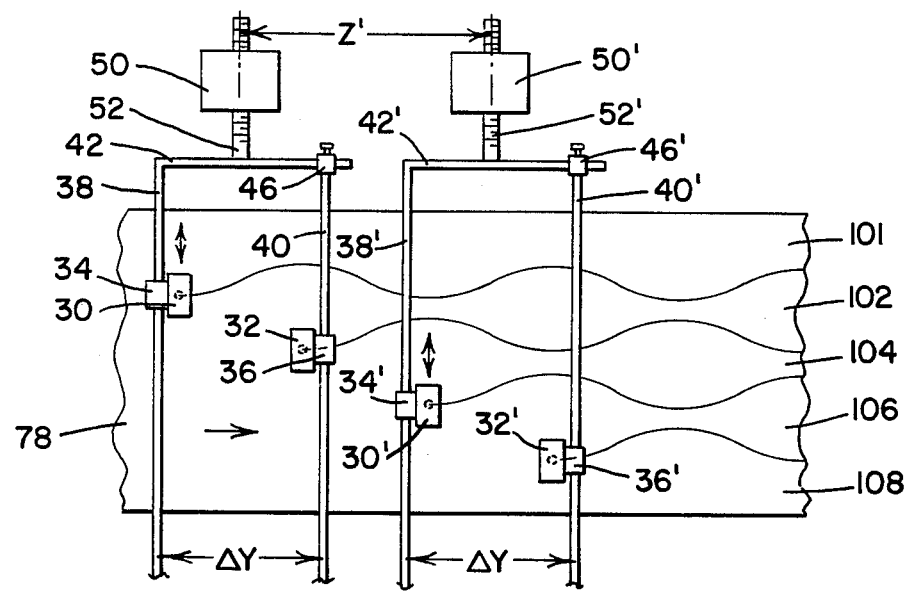

Other embodiments of cutting means A are considered to be within the scope of the invention when relative movement of the cutting beam projectors with respect to the metal workpiece produces a pattern of cut strand edges defining successively alternating widest and narrowest portions of a strand and having widest portions of a strand longitudinally between the widest portions of an adjacent strand. For example, the size of the beam projectors themselves may prevent them from being spaced closely enough along a single transverse row in order to produce a desired narrow strand width. In such a case the beam projectors may be disposed in an array as shown in FIG. 10 with two adjacent arrangements similar to that shown in FIG. 3. The embodiment shown in FIG. 10 will reciprocate the beam projectors at a transverse rate determined according to the longitudinal rate of motion of strip 78 and the spacing parameters ΔY and Z'.

The coordination of reciprocation of the beam projectors and the longitudinal motion of strip 200 so as to occur in proper time relation to one another will now be described with reference to FIG. 1. In FIG. 1 there is shown a beam cutting system comprising cutting means A, transport means B, and control means C. Transport means B comprises the metal strip supply source 60, strand receiving units 70, 72 and 74, motors 61, 62, 63, 64 and 65, and transport gude rollers 80, 82, 84, 86 and 88. The motors and transport guide rollers shown may be of any quantity and take any suitable form known in the art. The individual strand receiving units 70, 72 and 74 may be replaced by a single strand receiving unit 76 with motor 66, as shown in FIG. 2, or with other units as determined by the number of strands to be cut from the moving strip 200 and the intended use thereof. Control means C comprises controller 90 which may be a microprocessor of known form. By way of example, two modes of operation of the beam cutting system will be described as controlled by control means C.

First, a mode of operation may require system controller 90 to operate both transport means B and cutting means A in coordinated relationship. Accordingly, a first operating program is provided at Read Only Memory 91 (i.e., ROM 91) which then provides system controller 90 with the information representing the relative rates of the reciprocation movement of cutting means A and the longitudinal movement of the strip 200 by the transport means B which will produce the wave-like edge patterns 210, 220, 230 and 240 having the parameters determined by diameter d at circular areas D shown in FIG. 8, or another pattern as shown in FIG. 9. System controller 90 then operates transport means B through transport controller 93 in timed relationship with cutting means A, which in turn is operated through reciprocator controller 96. Transport controller 93 is operatively connected to motors 61, 62, 63, 64 and 65 by any suitable means (not shown), and reciprocator controller 96 is likewise operatively connected to reciprocator 50.

Another mode of operation of the beam cutting system may require transport means B to operate independently of cutting means A, as when the longitudinal speed of strip 200 varies according to the amount of material wound upon units 60, 70, 72 and 74 at any given time. A second operating program would then be provided at ROM 91 which would cause system controller 90 to operate reciprocator controller 96 according to the speed of transport means B as detected by sensor 94 and as conveyed thereby to system controller 90. System controller 90 operates cutting beam activator controller 95. Activator 97 is operatively connected to beam projectors 30 and 32 by any suitable means (not shown) and is operated by system controller 90 through activator controller 95 to energize projectors 30 and 32 so as to project strip cutting beams 31 and 33 onto strip 200 at selected intervals indicated by an operating program in ROM 91.

Control means C may alternately comprise a mechanical system using cams or other mechanical elements as shown in FIG. 6 wherein reciprocator 24 is operated by motor 25, which may either control or be responsive to the longitudinal movement of the strip along the feed path. Further variations within the system include reciprocating the beam projector in directions not perpendicular to the feed path of the strip but having usable perpendicular vector components thereof sufficient to provide the ΔX parameter described above or its equivalent.

Having thus described the invention, it is claimed:

1. A method of cutting a flat metal workpiece into a plurality of individual strips and comprising the steps of: positioning in strip cutting position with respect to said workpiece, a pair of cutting heads for projecting respective strip cutting beams onto the surface of said workpiece, and causing relative movement of each of said cutting heads with respect to said workpiece to cause said pair of cutting heads to traverse and cut strands from said workpiece having side edges which alternately converge and diverge with respect to one another.

2. The method of cutting a metal strip lengthwise into a plurality of individual strip-like strands, said method comprising the steps of: linearly moving said strip along a linear feed path: positioning in strip cutting position, with respect to said moving strip, a pair of cutting heads adapted to project respective strip cutting beams onto the moving strip when said cutting heads are activated: and, reciprocating each of said pair of cutting heads oppositely to one another laterally across said feed path in timed relation to the movement of said strip therealong to cause said pair of cutting heads to traverse cutting lines on and cut said moving strip along laterally spaced predetermined paths of corresponding shape but offset longitudinally of the strip from one another.

3. The method as defined in claim 2, wherein the said predetermined offset paths of the cutting lines traversed on said moving strip by the said cutting heads are of corresponding wave shape.

4. The method as defined in claim 3, wherein the said wave shape paths of the cutting lines traversed on said moving strip by the said cutting heads are sinusoidal and are approximately 180° out of phase longitudinally of the said feed path.

5. A method of cutting a sheet metal strip lengthwise into a plurality of individual strip-like strands, said method comprising the steps of: linearly moving the said strip at a given speed along a linear feed path: positioning in strip cutting position, with respect to said moving strip, an array of cutting heads adapted to project respective strip cutting beams onto the moving strip and disposed in staggered relation in two parallel rows extending transversely across said feed path, with adjacent staggered pairs of said cutting heads located in predetermined spaced apart relation both longitudinally and laterally of said feed path so as to longitudinally cut said moving strip into a plurality of strip-like strands when said cutting heads are activated; and, reciprocating said array of staggered cutting heads in unison laterally across said feed path in timed relation to the movement of said strip therealong to cause said adjacent staggered pairs of said cutting heads to traverse cutting lines on said moving strip along laterally spaced predetermined paths of corresponding shape but offset longitudinally of the strip from one another.

6. The method as defined in claim 5, wherein the said predetermined offset paths of the cutting lines traversed on said moving strip by the said cutting heads are of corresponding wave shape.

7. The method as defined in claim 6, wherein the said wave shape paths of the cutting lines traversed on said moving by the said cutting heads are sinusoidal and are approximately 180° out of phase longitudinally of the said feed path.

* * * * *